(12) United States Patent
Dutta et al.

(10) Patent No.: US 11,323,304 B2
(45) Date of Patent: May 3, 2022

(54) SELF-LEARNING CORRELATION OF NETWORK PATTERNS FOR AGILE NETWORK OPERATIONS

(71) Applicant: HEWLETT PACKARD ENTERPRISE DEVELOPMENT LP, Houston, TX (US)

(72) Inventors: Biswadeb Dutta, Chestnut Hill, MA (US); Raul De Diego Merino, Las Rozas (ES); Didier Albet, Mougins (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 56 days.

(21) Appl. No.: 16/696,815

(22) Filed: Nov. 26, 2019

(65) Prior Publication Data

US 2021/0006453 A1   Jan. 7, 2021

(30) Foreign Application Priority Data

Jul. 3, 2019   (EP) ..................................... 19315056

(51) Int. Cl.
*H04L 12/24*   (2006.01)
*H04L 41/0631*   (2022.01)
(Continued)

(52) U.S. Cl.
CPC .......... *H04L 41/064* (2013.01); *H04L 41/065* (2013.01); *H04L 41/069* (2013.01); *H04L 41/0681* (2013.01)

(58) Field of Classification Search
CPC . H04L 41/064; H04L 41/065; H04L 41/0681; H04L 41/069
(Continued)

(56) References Cited

U.S. PATENT DOCUMENTS 7,434,109 B1 * 10/2008 Stabile ................ H04L 41/0681
709/223
7,814,194 B2 * 10/2010 Hellerstein ......... H04L 41/0631
709/224

(Continued)

OTHER PUBLICATIONS

Paradis, L., & Han, Q. (2007). A survey of fault management in wireless sensor networks. Journal of Network and systems management, 15(2), 171-190. (Year: 2007).*
(Continued)

*Primary Examiner* — Melvin H Pollack
(74) *Attorney, Agent, or Firm* — Sheppard Mullin Richter & Hampton LLP (57) ABSTRACT

Various aspects of the subject technology relate to methods, systems, and machine-readable media for self-correlating network operations. The method includes receiving a stream of network messages, the stream of network messages comprising a variety of network events for various network devices. The method also includes identifying patterns within the stream of network messages, the patterns comprising groupings of the variety of network events. The method also includes determining for each pattern an appropriate operationalization scenario. The method also includes operationalizing the patterns as correlation rules in a correlation engine to automatically detect or predict network alarms from input provided by a fault management system.

21 Claims, 6 Drawing Sheets

(51) Int. Cl.
*H04L 41/0681* (2022.01)
*H04L 41/069* (2022.01)

(58) Field of Classification Search
USPC .......................................... 714/47; 709/224
See application file for complete search history.

(56) References Cited

U.S. PATENT DOCUMENTS

| | | | | |
|---|---|---|---|---|
| 8,156,553 | B1* | 4/2012 | Church | G06Q 10/06 726/22 |
| 8,396,959 | B2* | 3/2013 | Telfer | H04L 43/00 709/224 |
| 8,527,811 | B2 | 9/2013 | Gilbert et al. | |
| 9,030,953 | B2* | 5/2015 | Purohit | H04L 1/08 370/252 |
| 9,250,945 | B2* | 2/2016 | Watkins | G06F 9/45558 |
| 9,563,670 | B2* | 2/2017 | Wasson | G06F 16/2465 |
| 9,571,577 | B2* | 2/2017 | Grube | H04L 29/08549 |
| 9,686,140 | B2* | 6/2017 | Pacella | H04L 41/06 |
| 9,929,924 | B2* | 3/2018 | Lynam | H04L 41/0631 |
| 10,129,593 | B2* | 11/2018 | Badawiyeh | H04N 21/23424 |
| 10,324,430 | B2* | 6/2019 | Geffin | G06F 1/329 |
| 10,338,977 | B2* | 7/2019 | Yoon | G06F 11/3072 |
| 10,404,732 | B2* | 9/2019 | Munro | G06N 20/00 |
| 10,462,004 | B2* | 10/2019 | Hsiao | G06F 3/04842 |
| 10,469,309 | B1* | 11/2019 | Gupta | H04L 67/10 |
| 10,484,332 | B2* | 11/2019 | YiSan | H04L 63/0236 |
| 10,489,363 | B2* | 11/2019 | Yang | G06N 5/025 |
| 10,496,396 | B2* | 12/2019 | Garvey | G06N 20/00 |
| 10,511,556 | B2* | 12/2019 | Wang | H04L 51/16 |
| 10,600,012 | B2* | 3/2020 | Peterson | G06Q 10/0635 |
| 10,616,040 | B2* | 4/2020 | Huang | H04L 41/0631 |
| 10,628,245 | B2* | 4/2020 | Clifone | G06F 11/008 |
| 10,652,080 | B2* | 5/2020 | Golin | H04L 41/0672 |
| 10,686,867 | B2* | 6/2020 | Bhaskar | H04L 67/2833 |
| 10,693,898 | B2* | 6/2020 | Iliofotou | H04L 63/1408 |
| 10,700,950 | B2* | 6/2020 | Hsiao | H04L 43/045 |
| 10,708,151 | B2* | 7/2020 | Dixon | H04L 41/0654 |
| 10,728,085 | B1* | 7/2020 | Chen | H04L 41/0659 |
| 10,728,954 | B2* | 7/2020 | Dahan | H04L 41/0816 |
| 10,833,942 | B2* | 11/2020 | Apostolopoulos | G06K 9/6278 |
| 10,885,065 | B2* | 1/2021 | Dunne | G06N 5/003 |
| 10,922,204 | B2* | 2/2021 | Bonnell | G06F 11/3409 |
| 10,929,464 | B1* | 2/2021 | Zuczek | G06F 16/432 |
| 10,963,519 | B2* | 3/2021 | Burke | G06K 9/6272 |
| 11,036,741 | B2* | 6/2021 | Zhou | G06F 16/24564 |
| 11,042,534 | B2* | 6/2021 | Beedgen | G06F 17/40 |
| 11,049,033 | B2* | 6/2021 | Kolar | H04L 41/5067 |
| 11,055,405 | B1* | 7/2021 | Jin | G06F 16/245 |
| 11,062,230 | B2* | 7/2021 | Assem Aly Salama | G06N 20/00 |
| 11,074,434 | B2* | 7/2021 | Gupta | G06K 9/00288 |
| 11,093,561 | B2* | 8/2021 | Douze | G06N 20/20 |
| 11,102,534 | B2* | 8/2021 | Wu | H04N 21/26275 |
| 2002/0165842 | A1* | 11/2002 | Hellerstein | G06N 5/025 706/47 |
| 2016/0070763 | A1* | 3/2016 | Wang | G06F 16/285 707/737 |
| 2016/0205697 | A1 | 7/2016 | Tan et al. | |
| 2017/0118092 | A1 | 4/2017 | Dixon et al. | |
| 2018/0211167 | A1* | 7/2018 | Xu | H04L 41/0622 |
| 2019/0163680 | A1* | 5/2019 | Mizoguchi | G06F 16/2474 |
| 2019/0258677 | A1* | 8/2019 | Beedgen | G06F 16/9017 |

OTHER PUBLICATIONS

R. Vaarandi, "A data clustering algorithm for mining patterns from event logs," Proceedings of the 3rd IEEE Workshop on IP Operations & Management (IPOM 2003) (IEEE Cat. No. 03EX764), Kansas City, MO, USA, 2003, pp. 119-126, doi: 10.1109/IPOM.2003.1251233. (Year: 2003).*

G. Jakobson and M. Weissman, "Alarm correlation," in IEEE Network, vol. 7, No. 6, pp. 52-59, Nov. 1993, doi: 10.1109/65.244794. (Year: 1993).*

Vincent Liu and Daniel Halperin and Arvind Krishnamurthy and Thomas Anderson, "F10: A Fault-Tolerant Engineered Network", 10th {USENIX} Symposium on Networked Systems Design and Implementation, Apr. 2013, pp. 399-412 (Year: 2013).*

Boutaba, R., Salahuddin, M.A., Limam, N. et al. A comprehensive survey on machine learning for networking: evolution, applications and research opportunities. J Internet Serv Appl 9, 16 (2018). https://doi.org/10.1186/s13174-018-0087-2 (Year: 2018).*

Y. Yu et al., "Fault Management in Software-Defined Networking: A Survey," in IEEE Communications Surveys & Tutorials, vol. 21, No. 1, pp. 349-392, First quarter 2019, doi: 10.1109/COMST.2018.2868922. (Year: 2019).*

Yuan, Ding and Mai, Haohui et al. , "SherLog: Error Diagnosis by Connecting Clues from Run-Time Logs," Proceedings of the Fifteenth International Conference on Architectural Support for Programming Languages and Operating Systems, Mar. 2010, 143-154 (Year: 2010).*

Andoni et al., "Near-Optimal Hashing Algorithms for Approximate Nearest Neighbor in High Dimensions", Communication of the ACM, Jan. 2008, vol. 51, issue No. 1, pp. 117-112.

Andrei Z. Broder, "On the Resemblance and Containment of Documents", Digital Systems Research Center, Jun. 1997, pp. 1-9.

Cohen et al., "Finding Interesting Associations Without Support Pruning", 2001, 12 pages.

Doug Junkins, "Machine Learning Will Transform the Way the Cable Industry Manages Alarms", Guavus Blog, available online at <https://www.guavus.com/machine-learning-will-transform-the-way-the-cable-industry-manages-alarms-2/>, Nov. 13, 2018, pp. 1-7.

Extended European Search Report received for EP Patent Application No. 19315056.2, dated Jan. 8, 2020, 08 pages.

Feigenbaum et al., "Knowledge Processing: from File Servers to Knowledge Servers", 1985, pp. 1-9.

GT Hill, "AI, machine learning and your access network", IDG Contributor Network, available online at <https://www.networkworld.com/article/3256013/ai-machine-learning-and-your-access-network.html>, Feb. 20, 2018, 5 pages.

Gupta et al., "Parallel Algorithms and Architectures for Rule-Based Systems", IEEE, 1986, pp. 28-37.

Han et al., "Mining Frequent Patterns without Candidate Generation", 2000, pp. 1-12.

Kumar et al., "Machine Intelligence at the NOC", Ericsson, available online at <https://www.ericsson.com/en/blog/2018/6/machine-intelligence-at-the-noc>, Jun. 7, 2018, pp. 1-8.

Li et al., "PFP: Parallel FP-Growth for Query Recommendation", 2008, 8 pages.

Ram Sridharan, "AI and ML in Transforming Network Operations", Broadband Library, available online at <https://broadbandlibrary.com/ai-and-ml-in-transforming-network-operations/>, Jan. 12, 2018, pp. 1-5.

* cited by examiner

SELF-LEARNING CORRELATION OF NETWORK PATTERNS FOR AGILE NETWORK OPERATIONS

CROSS REFERENCE TO RELATED APPLICATIONS

This application claims priority benefit to, EP patent application Ser. No. 19315056.2, filed Jul. 3, 2019, the disclosure thereof hereby incorporated by reference in its entirety for all purposes.

BACKGROUND

Communications Service Providers (CSPs) have been using expert systems embedded in surveillance systems for decades. These expert systems have an enormous amount of human experience and knowledge captured in them, over decades, typically in the form of operational rules. With the advent of Network Function Virtualization (NFV) and Software Driven Networks (SDN), new Virtualized Network Functions (VNFs) and associated services are introduced, changed, and phased out far more rapidly than in the past. As a result, there is an increasing need to accelerate the knowledge retrieval and capture process, discover these rules, and operationalize them within the time frames in which new VNFs and associated services are pushed to the market.

BRIEF DESCRIPTION OF THE DRAWINGS

The following detailed description references the drawings, wherein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

A surveillance platform, more commonly known as a fault management system, is an important tool in operations support systems (OSS) that are utilized in operations environments by CSPs. Today, it is difficult to find a surveillance platform that does not have some capability to capture human operator experience for facilitating automated network and service problem inference. This problem inference capability is more commonly referred to as correlation in CSP contexts.

Expert systems, based on the Rete algorithm and its many variants, have been used for decades in CSP environments for this correlation purpose. One of their major weaknesses lies in the fact that they need to be populated with human intelligence, in the form of correlation rules, to work in real time on event and alarm streams to infer and identify problems needing remediation. Expert systems or production rules engines based on the Rete algorithm, and its extensions, have been exploited very successfully in finance, accounting, insurance, healthcare and medicine, energy and utilities, and even in space vehicle operations, amongst many others. The principal reason they were so successful is due to the fact that in these application domains the knowledge base, or operational rules or business rules, were known upfront and all that was needed was a software platform enabling production deployment and application of this knowledge base in real time during run-time. In contrast, in CSP or telecommunication environments, the knowledge base of operational rules is not known until the network gets assembled and production usage starts (e.g., the network begins carrying customer traffic). Following this, operations' teams and network engineers work laboriously, over long periods of time, to learn these rules.

Current generation networks are increasingly deploying VNFs with SDN to facilitate the creation of innovative services to increase revenue generation and average revenue per user, more commonly referred to as ARPU. The ability of a CSP to be creative, reduce the time to market, generate revenue, prevent churn, and reduce capital and operating costs is enabled through the use of VNFs and SDN. This essentially mandates that the CSP must be prepared to operate the network and associated services in very short time frames. System engineering teams do not have the luxury of long time frames to come up with the correlation rules as they did in the past. Therefore, there is a need for a solution that removes the dependency on human experience and automates the creation of knowledge in a surveillance platform by applying a unique combination of machine-learning techniques.

Disclosed are methods, systems, and machine-readable media that provide for self-learning correlation of network patterns for agile network operations. This works by a combination of unsupervised machine-learning techniques to discover the correlation rules and supervised machine learning-techniques to operationalize those rules in a production rules-based expert system embedded in a surveillance platform.

The disclosed methods, systems, and machine-readable media address a problem in traditional CSP fault management systems, as described above, involving resource intensive gathering and training of operational rules for operationalization in surveillance platforms. The disclosed methods, systems, and machine-readable media solve this technical problem by providing a solution also rooted in computer technology, namely, by discovering operational knowledge in the form of correlation rules (e.g., patterns), analyzing the patterns graphically through a user interface to identify patterns that are meaningful to operationalize, and providing automated flow-through operationalization of the meaningful discovered patterns in an expert system, which applies the discovered knowledge on a real-time flow of network events that are processed by a surveillance platform.

The disclosed subject technology further provides improvements to fault management effectiveness through a computer by reducing processing time and increasing automated resolution of potential network errors. The described techniques also provide improved responsiveness by reducing diagnostic time for identifying network issues, removal of non-significant alarms and duplicated alarms, and reduction in symptomatic alarm information in order to focus attention on root cause to determine a resolution.

Figure 1:
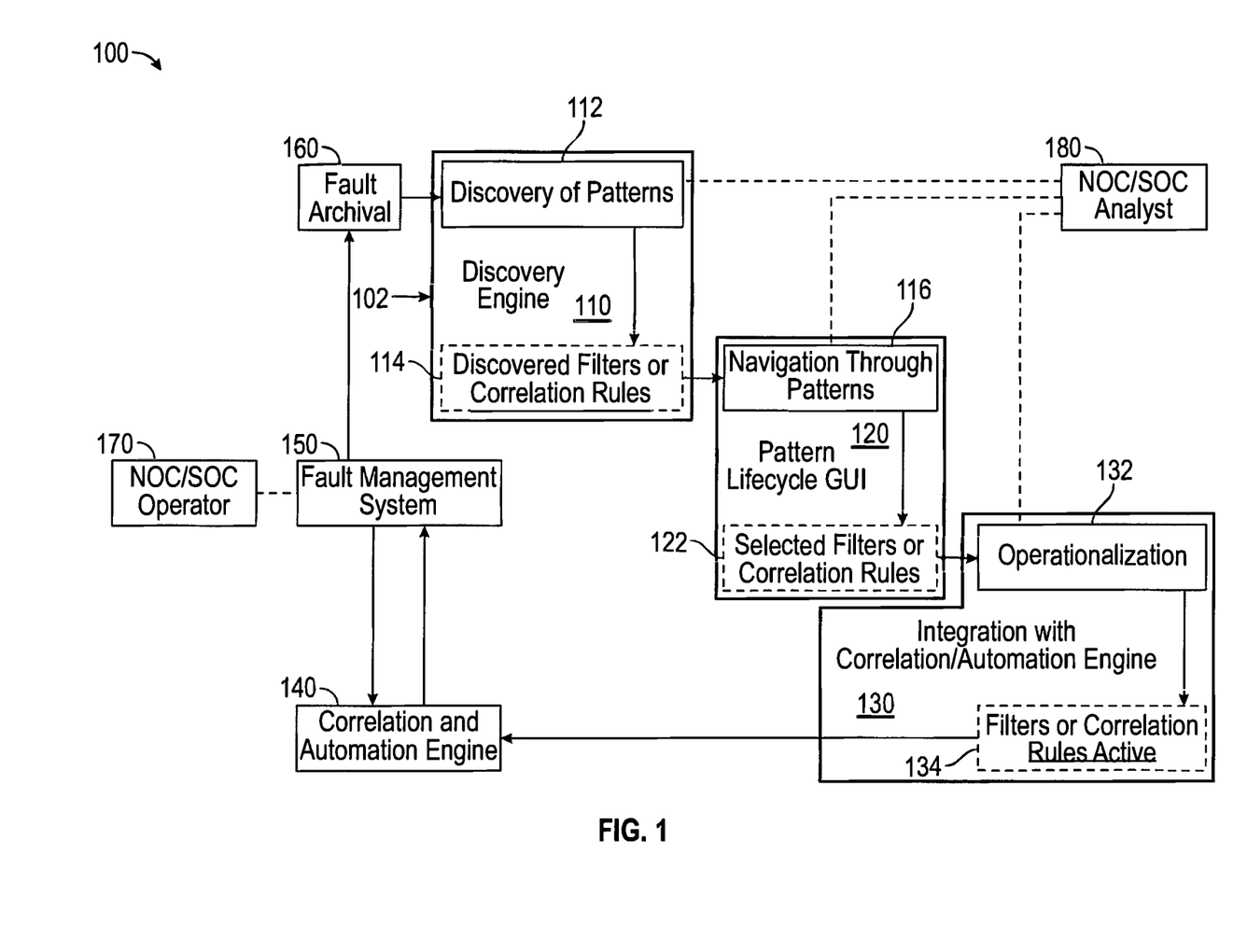
FIG. 1 is a diagram illustrating an example system for self-learning correlation of network patterns for agile network operations, according to certain aspects.

FIG. 1 is a diagram illustrating an example system 100 for self-learning correlation of network patterns for agile network operations, according to certain aspects of the present disclosure. The system 100 may include a correlation/automation engine 140 coupled to a fault management system 150. The fault management system 150 may be operated by an operator 170.

An analyst 180 (e.g., an expert user) may discover patterns through a discovery engine 110, determine correlation rules 114 through a pattern lifecycle graphical user interface (GUI) 120, and operationalize them into the correlation/automation engine 140 automatically through a specific system integration (e.g., system integration 130). Once correlation rules have been operationalized in the correlation/automation engine 140, the fault management system 150 may then take advantage of the reduction in the number of events/alarms to be managed by the operator 170, by detecting hidden problems or by anticipating future issues.

A fault archival 160, besides being used as input of the discovery process, may be utilized by the fault management system 150 to determine efficiency of the implemented correlation rules. The efficiency of the implemented correlation rules may be utilized as input back into the discovery engine 110 to further fine tune the correlation rules. In this way, the implemented correlation rules may be continuously improved for better efficiency.

According to an aspect of the present disclosure, the discovery engine 110 may be configured to receive a stream of network messages 102. For example, the stream of network messages may include a variety of network events for various network devices. The discovery engine 110 may graphically display the stream of network messages on the pattern lifecycle GUI 120, such that the analyst 180 may visually identify patterns 116 within the stream of network messages. For example, the analyst 180 may utilize data-driven analysis to discover filters or correlation rules 114 through the discovery engine 110. The analyst 180 may utilize offline/automatic collaborative analysis to select filters or correlation rules 122 through the pattern lifecycle GUI 120.

The identified patterns may be identified as correlation rules for specific network events to be integrated in the correlation/automation engine 140 by an automatic interface. For example, the automatic interface may include system integration 130, operationalization 132, and correlation rules 134. According to an aspect, the analyst 180 may utilize offline/automatic integration to activate/operationalize 132 the discovered filters or correlation rules 114 at the correlation/automation engine 140. In an implementation, the analyst 180 may interact with each of the discovery engine 110, the pattern lifecycle GUI 120, and the correlation/automation engine 140 in an off-line manner.

According to aspects, the discovery of the patterns 112 may include a preliminary step of normalizing the network messages by removing information identifying a name assigned to a network element (e.g., a network device), a time at which the network message was generated, a location of the network element, and any other such information. According to additional aspects, a post normalization step may include utilization of an unsupervised learning technique to cluster or label the network messages. For example, the Locality Sensitive Hashing (LSH) algorithm may be utilized to split the collection of network messages from a particular family of equipment into equivalence classes.

According to an aspect of the present disclosure, the discovery engine 110 may utilize a Frequent Pattern Growth feature of the FP-Growth algorithm (e.g., frequent pattern mining algorithm) to identify collections of related network equipment messages (e.g., patterns). For example, the FP-Growth algorithm may be presented with several transactions (e.g., groupings of network messages) at a time as the input data for discovery of the patterns. In an implementation, the Parallel Frequent Pattern growth (PFP) algorithm, which is a parallelized version of the FP-Growth algorithm, may be utilized, as the size of input data sets may be large and the messages are machine generated, which make them difficult to process without machine help.

In the context of network equipment messages, time slices or windows containing message occurrences may considered as transactions. According to aspects, an archive of network equipment messages spanning a reasonable time horizon may be retrieved for pattern analysis by the discovery engine 110. The time horizon (e.g., timeline) may be split up into contiguous time slices, as illustrated below in FIGS. 2A-2C. Each time slice may contain a set of messages, such as in the form of labels or tags. The time slices may be presented as input to the FP-Growth algorithm. While splitting the time horizon into contiguous time slices, it is possible that a meaningful pattern of messages could get split across the adjacent boundaries of a pair of time slices. To account for these scenarios, a time shift may be introduced to create multiple contiguous transaction sequences using increasing time shifts, as discussed further below in FIGS. 2A-2C.

After the generated patterns have been analyzed by the analyst 180 (e.g., a human expert) and shortlisted for provisioning in the correlation/automation engine 140 (e.g., production rules engine), the correlation/automation engine 140 may automatically instantiate the pattern and its associated labels. For example, the system integration 130 may utilize a combination of Term Frequency-Inverse Document Frequency (TF-IDF) and Jaccard Similarity metrics to generate regular expressions (e.g., regexp) that enable the automation engine 140 to uniquely identify a label associated with a message arriving in real time in the fault management system 150 (e.g., surveillance system). While selecting the patterns to be provisioned, the analyst 180 may also decide on a type of inference processing that the discovery engine 110 will perform upon reception of the incoming messages.

It is understood that that all tasks performed by human users of the system 100 are related to decisions regarding meaningful patterns and type of inference processing. The human users are not expected to have programming expertise or machine learning background.

Figure 2A:
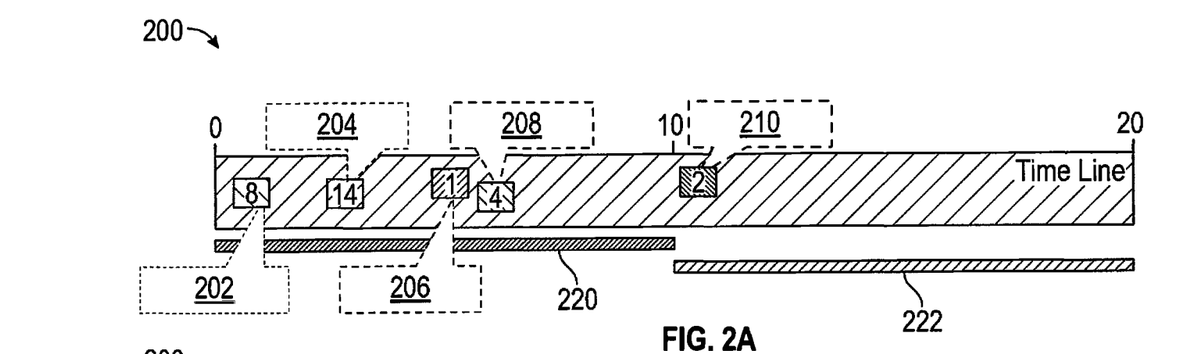
FIGS. 2A-2C are example diagrams of sampled network events over various time slices, according to certain aspects.
Figure 2B:
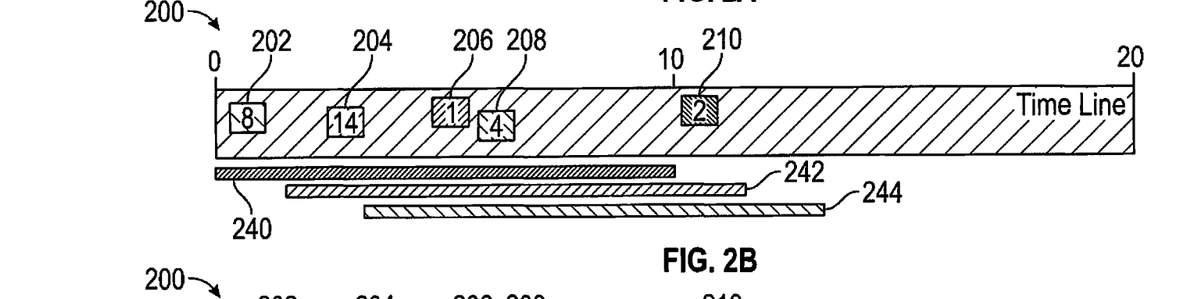
Figure 2C:
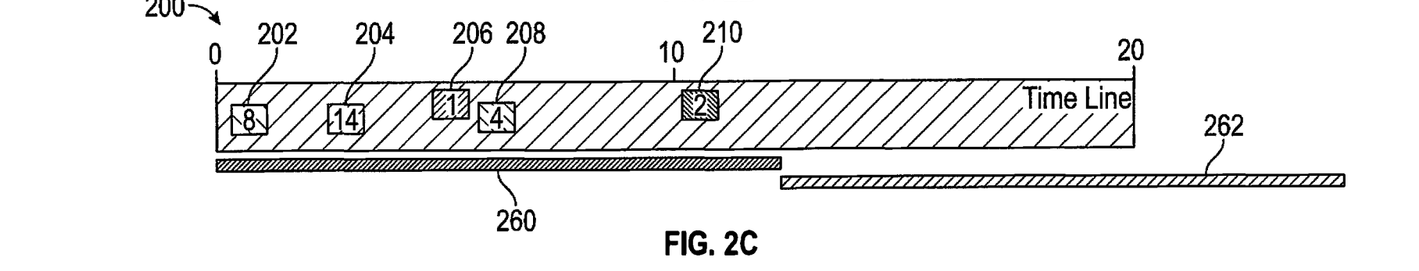

FIGS. 2A-2C are example diagrams of sampled network events over various time slices, according to certain aspects of the present disclosure. Referring to FIG. 2A, a timeline 200 may include several network events 202-210. Each network event 202-210 may correspond to a different status message for various network devices. Each network event 202-210 may also be given a tag or label. For example, network event 202 may be labelled or tagged as the number 8, and may correspond to a connection lost for a chassis agent. Network event 204 may be labelled or tagged as the number 14, and may correspond to service down for a specific device. Network event 206 may be labelled or tagged as the number 1, and may correspond to a specific network adapter being down. Network event 208 may be labelled or tagged as the number 4, and may correspond to a chassis being down. Network event 210 may be labelled or tagged as the number 2, and may correspond to a change in fan state for a network device. It is understood that these network events and labels/tags are exemplary only, and other network events may be included with the same or different labels/tags.

According to an aspect of the present disclosure, the timeline 200 may be split up into time slices 220 and 222 for sampling of the network events 202-210 over different intervals. For example, the time slices 220 and 222 may be contiguous and non-overlapping. In an implementation, the timeline 200 may have a total window size of at least 20 time units (e.g., milliseconds, seconds, minutes, hours, etc.), depending on a frequency of the received network events 202-210. A first time slice 220 may have a window size of 10 time units, and a second time slice 222 may have a window size of 10 time units that is shifted by 10 time units as well. As a result, the first time slice 220 captures network events 202-208, while the second time slice 222 captures only network event 210.

Referring to FIG. 2B, the timeline 200 includes the same network events 202-210, but the network events 202-210 are captured over different time slices 240-244. For example, a first time slice 240 may have a window size of 10 time units, a second time slice 242 may have a window size of 10 time units and is also shifted by 2 time units from the first time slice 240. A third time slice 244 may also have a window size of 10 time units and is shifted by 2 time units from the second time slice 242. As a result, the first time slice 240 captures network events 202-208, the second time slice 242 captures network events 204-210, and the third time slice captures network events 206-210.

Referring to FIG. 2C, the timeline 200 includes the same network events 202-210, but the network events 202-210 are captured over different time slices 260-262. For example, a first time slice 260 may have a window size of 12 time units, and a second time slice 262 may have a window size of 12 time units and is also shifted by 12 time units from the first time slice 260. As a result, the first time slice 260 captures network events 202-210, and the second time slice 262 does not capture any of the network events 202-210.

It is understood that the window sizes and time shifts are exemplary only and may vary between different time slices. For example, the window sizes may be of different sizes for each time slice, and each time shift may be different for each time slice. It is also understood that the number of time slices may be greater than or equal to one. It is further understood that by varying the window size and time shifts for different time slices, different patterns of the network events may be captured such that nothing is lost. It is further understood that a timeline of more or less than 20 time units is permitted.

Figure 3A:
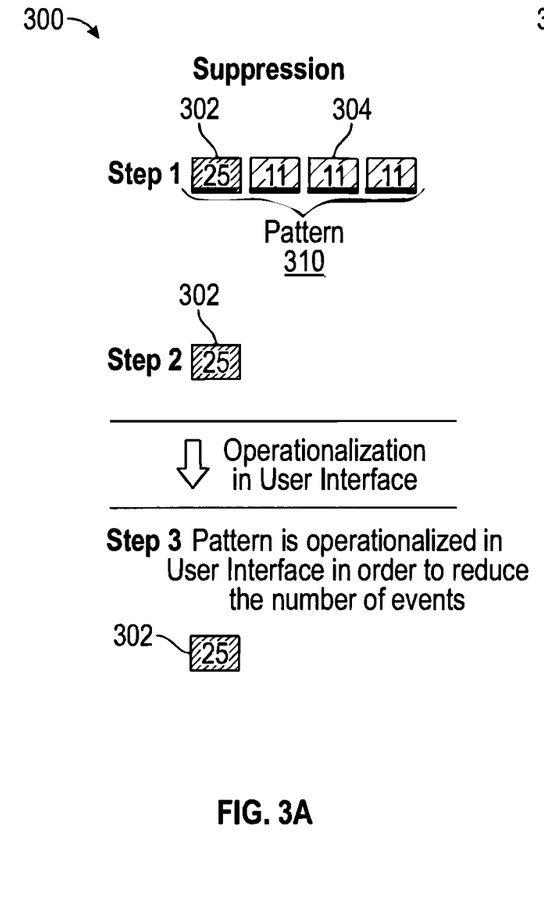
FIGS. 3A-3C illustrate example correlation action execution patterns, according to certain aspects.
Figure 3B:
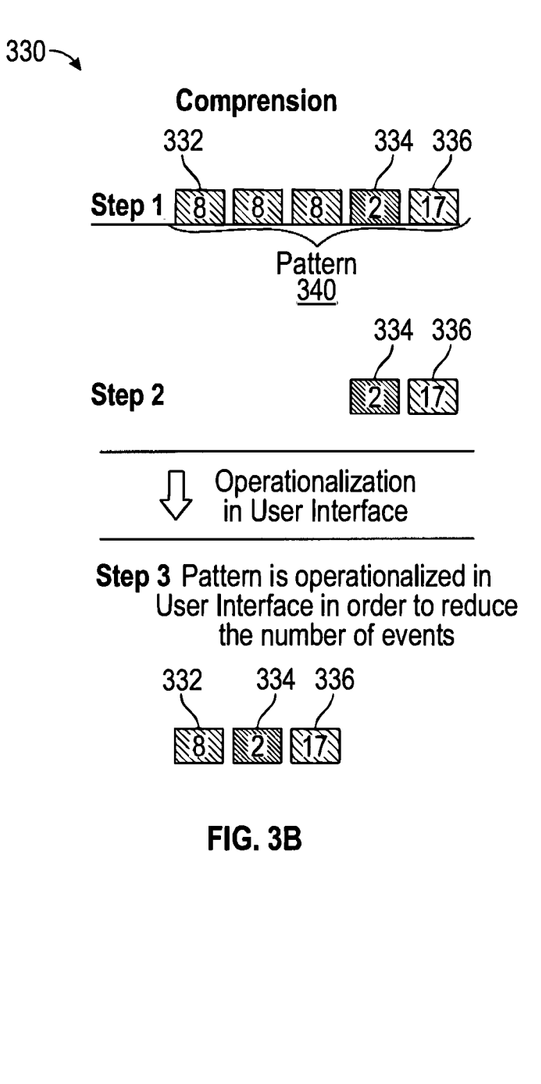
Figure 3C:
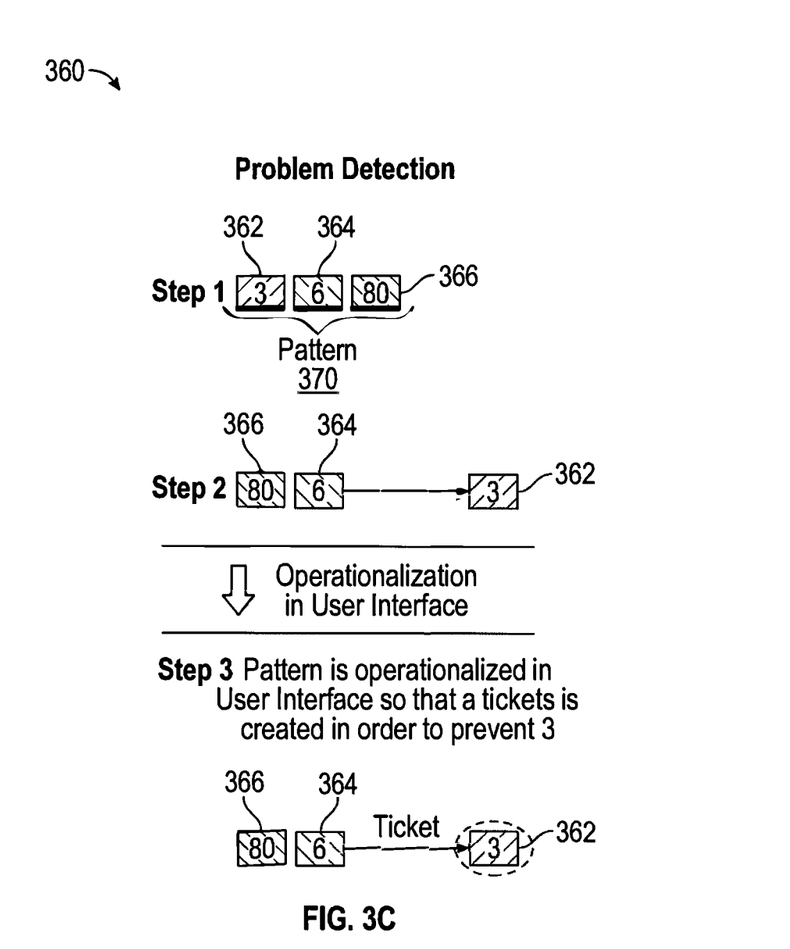

FIGS. 3A-3C illustrate example correlation action execution patterns according to certain aspects of the present disclosure. Referring to FIG. 3A, a diagram 300 illustrates a pattern 310 that is identified as including one instance of a first network event 302 and three instances in a row of a second network event 304. It may be determined by a human expert (e.g., analyst 180) that the repeat instances of the second network event 304 are not relevant, and so they may be suppressed by removing them from consideration in the pattern 310. For example, a subset of messages in the pattern 310 may be suppressed. As a result, the pattern 310 becomes operationalized in the correlation/automation engine 140 and applied to the output events from the fault management system 150 as having only the first network event 302.

Referring to FIG. 3B, a diagram 330 illustrates a pattern 340 that is identified as including three instances in a row of a first network event 332, followed by one instance a second network event 334 and one instance of a third network event 336. It may be determined by a human expert (e.g., analyst 180) that the repeat instances of the first network event 332 are repetitive, and so may be compressed/grouped to just one instance. For example, of a subset of messages in the pattern 340 may be compressed. As a result, the pattern 310 becomes operationalized in the correlation/automation engine 140 and applied to the output events from the fault management system 150 as having only one instance of each of the first network event 332, the second network event 334, and the third network event 336.

Referring to FIG. 3C, a diagram 360 illustrates a pattern 370 that is identified as including one instance of a first network event 362, one instance of a second network event 364, and one instance of a third network event 366. It may be determined by a human expert (e.g., analyst 180) that the second network event 364 and the third network event 366 result in the first network event 362. For example, the first network event 362 may be a major event, such as a server shutdown. As a result, the pattern 310 becomes operationalized in the correlation/automation engine 140 and applied to the output events from the fault management system 150 to issue a ticket in order to prevent the occurrence of the first network event 362 when the third network event 366 and the second network event 364 are detected. In this way major network events may be predicted and prevented. For example, some messages in the pattern 370 may be grouped and followed by a generation of a synthetic problem message to a user (e.g., operator 170).

It is noted that the network events described above may not necessarily occur in the order labelled. For example, the first network event 362 of FIG. 3C may occur after the third network event 366. It is further understood that the above-described network events may be for different network devices, as described in FIGS. 2A-2C.

According to aspects of the present disclosure, faults may be enriched with information coming from other data sources, which allows for an increased level of correlation/automation. For example, the different data sources may be preprocessed to fit a format expected by the pattern discovery engine (e.g., discovery engine 110). By enriching alarms with information related to trouble-tickets, the number of patterns eligible to be operationalized may be reduced (i.e., as interesting patterns are only those ending up in an alarm related to a ticket), leading to a lot of time saved by the operators.

The techniques described herein may be implemented as method(s) that are performed by physical computing device(s), as one or more non-transitory computer-readable storage media storing instructions (e.g., non-transitory machine-readable storage medium encoded with instructions executable by at least one hardware processor of a network device) which, when executed by computing device(s), cause performance of the method(s), or, as physical computing device(s) that are specially configured with a combination of hardware and software that causes performance of the method(s).

Figure 4:
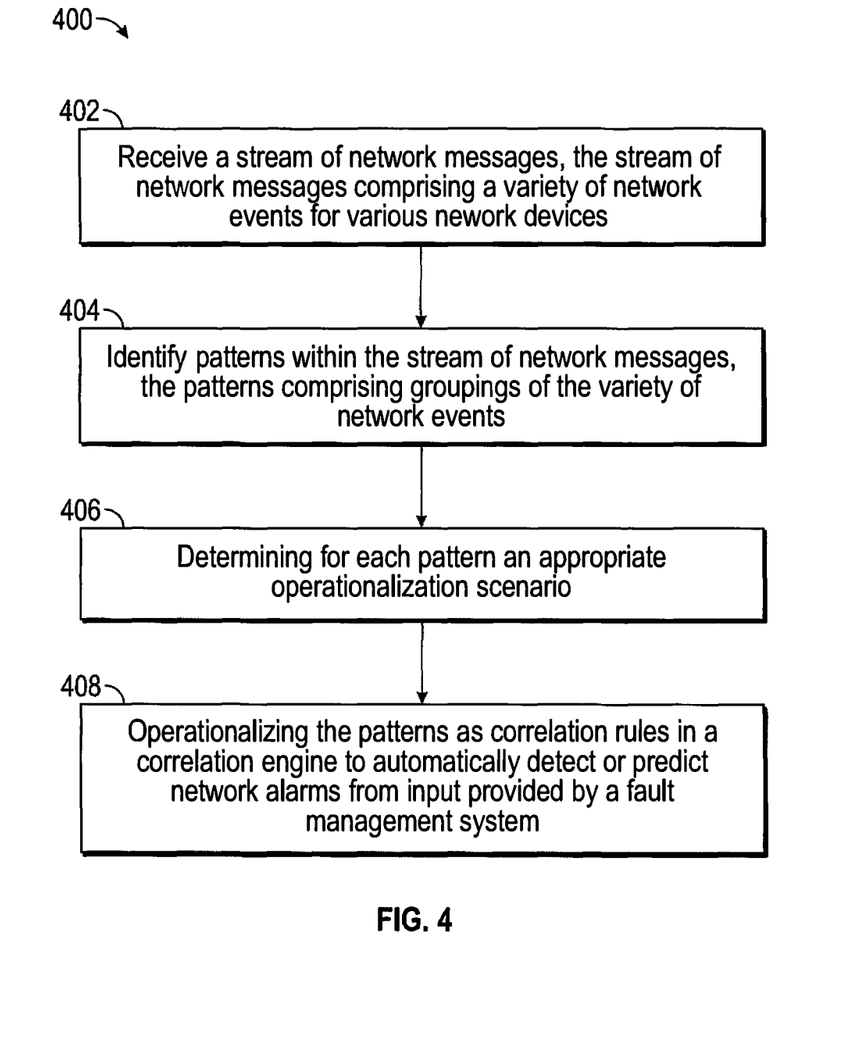
FIG. 4 illustrates an example flow diagram for self-learning correlation of network patterns for agile network operations.

FIG. 4 illustrates an example flow diagram (e.g., process 400) for self-learning correlation of network patterns for agile network operations, according to certain aspects of the disclosure. For explanatory purposes, the example process 400 is described herein with reference to the system 100 of FIG. 1, the timelines 200 of FIGS. 2A-2C, and the patterns of FIGS. 3A-3C. Further, for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the process 400 will be discussed in reference to FIGS. 1, 2A-2C, and 3A-3C.

At block 402, a stream of network messages is received. The stream of network messages may include a variety of network events for various network devices. At block 404, patterns within the stream of network messages are identified. The patterns may include groupings of the variety of network events. At block 406, it is determined for each pattern a list of operationalization/activation scenarios. At block 408, the patterns are operationalized as correlation rules in a correlation/automation engine to automatically detect and predict network alarms from events received from a fault management system.

For example, at block 402, a stream of network messages is received at the discovery engine 110. The stream of network messages may include a variety of network events for various network devices. At block 404, patterns (e.g., patterns 310, 340, 370 of FIG. 3) within the stream of network messages are identified. The patterns may include groupings of the variety of network events. For example, the patterns may be identified over various time slices, as illustrated in FIGS. 2A-2C. At block 406, an analyst 180 may determine that for each pattern, the list of operationalization/activation scenarios (e.g., suppression, compression, and/or problem detection/prediction). At block 408, the patterns are operationalized by an automatic system interface (e.g., system integration 130) into the correlation/automation engine 140 as correlation rules to automatically detect or predict network problems from the events received from the fault management system.

According to an aspect, the process 400 further includes normalizing the stream of network messages. For example, the normalizing may include removing identifying information of the various network devices, removing timestamps associated with generation of the stream of network messages, and removing location information of various network devices.

According to an aspect, the process 400 further includes analyzing the patterns graphically by an expert user to identify the patterns. According to an aspect, the process 400 further includes suppressing a subset of the variety of network events that are repetitive by removing the subset of the variety of network events from the stream of network messages.

According to an aspect, the process 400 further includes compressing a subset of the variety of network events that are repetitive by maintaining only one occurrence of a network event of the subset. According to an aspect, the process 400 further includes generating an alarm in response to an identified pattern that correlates to a hidden network issue or anticipating a future problem by triggering an alert or a ticket. For example, an actual or predictive alert may be generated in response to an identified pattern that correlates to a network incident.

According to an aspect, the process 400 further includes dividing the stream of network messages into contiguous and non-overlapping time slices, each time slice containing a subset of the stream of network messages. According to an aspect, the process 400 further includes increasing a time shift for each time slice to create multiple contiguous network message sequences for identifying the patterns.

Figure 5:
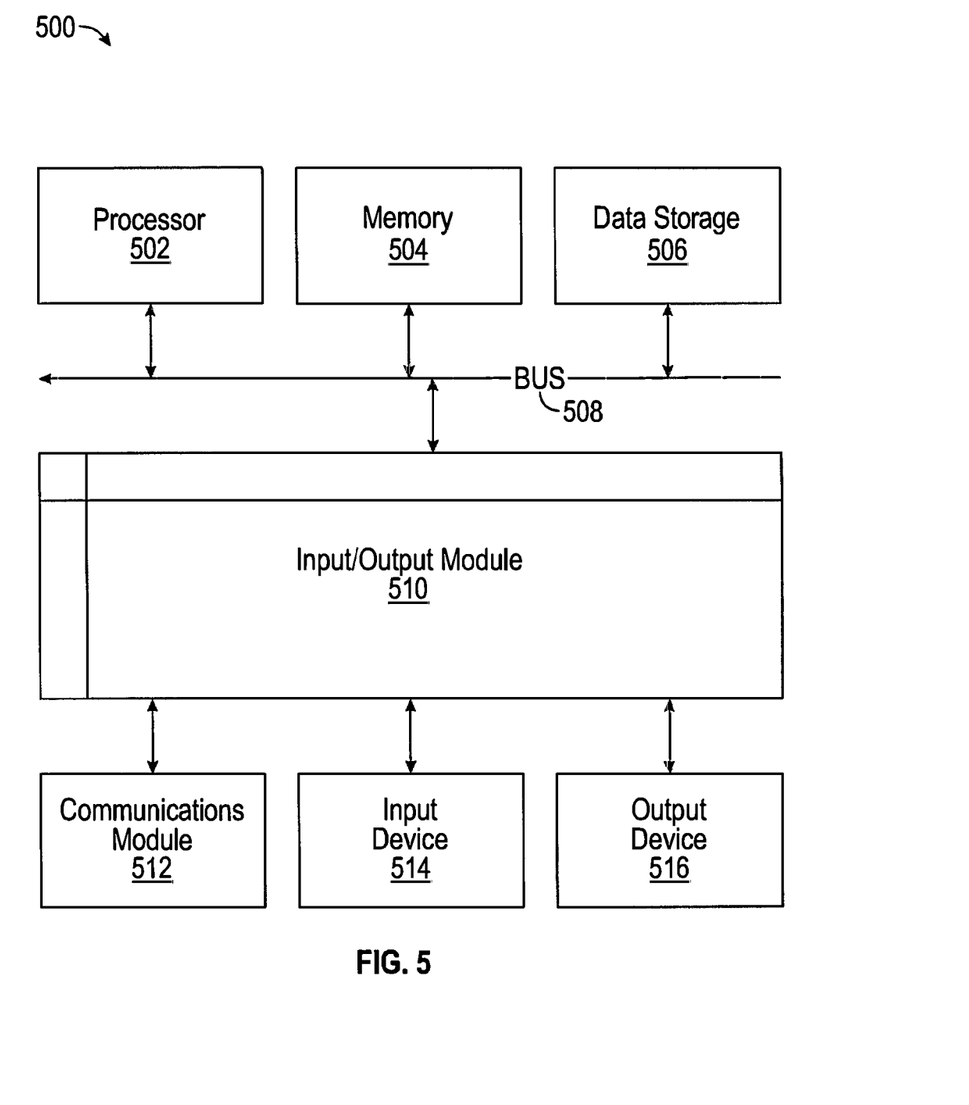
FIG. 5 is a block diagram illustrating an example computer system with which aspects of the subject technology may be implemented.

FIG. 5 is a block diagram illustrating an exemplary computer system 500 with which the system 100 of FIG. 1 may be implemented. In certain aspects, the computer system 500 may be implemented using hardware or a combination of software and hardware, either in a dedicated server, integrated into another entity, or distributed across multiple entities.

The computer system 500 includes a bus 508 or other communication mechanism for communicating information, and a processor 502 coupled with a bus 508 for processing information. According to one aspect, the computer system 500 can be a cloud-computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. The processor 502 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to the bus 508 for storing information and instructions to be executed by the processor 502. The processor 502 and the memory 504 can be supplemented by, or incorporated in, special purpose logic circuitry. Expansion memory may also be provided and connected to the computer system 500 through the input/output module 510, which may include, for example, an SIMM (Single In Line Memory Module) card interface. Such expansion memory may provide extra storage space for the computer system 500, or may also store applications or other information for the computer system 500. Specifically, expansion memory may include instructions to carry out or supplement the processes described above, and may include secure information also. Thus, for example, expansion memory may be provided as a security module for the computer system 500, and may be programmed with instructions that permit secure use of the computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

The computer system 500 further includes a data storage device 506 such as a magnetic disk or optical disk, coupled to the bus 508 for storing information and instructions. The computer system 500 may be coupled via input/output module 510 to various devices. The input/output module 510 can be any input/output module. Example input/output modules 510 include data ports such as USB ports. In addition, the input/output module 510 may be provided in communication with the processor 502, so as to enable near area communication of the computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies: a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic, or optical signals that carry digital data streams representing various types of information. The network link typically provides data communication through one or more networks to other data devices. For example, the network link of the communications module 512 may provide a connection through a local network to a host computer or to data equipment operated by an Internet Service Provider (ISP). The ISP in turn provides data communication services through the worldwide packet data communication network now commonly referred to as the "Internet." The local network and Internet both use electrical, electromagnetic, or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link, and the communications module 512. In the Internet example, a server might transmit a requested code for an application program through the Internet, the ISP, the local network, and the communications module 512. The received code may be executed by the processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 516 may comprise appropriate circuitry for driving the output device 516 to present graphical and other information to a user.

According to one aspect of the present disclosure, the systems of FIGS. 1-3 can be implemented using a computer system 500 in response to a processor 502 executing one or more sequences of one or more instructions contained in memory 504. Such instructions may be read into memory 504 from another machine-readable medium, such as a data storage device 506. Execution of the sequences of instructions contained in main memory 504 causes the processor 502 to perform the process steps described herein. One or more processors in a multi-processing arrangement may also be employed to execute the sequences of instructions contained in memory 504. The processor 502 may process the executable instructions and/or data structures by remotely accessing the computer program product, for example, by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component (e.g., a data server), or that includes a middleware component (e.g., an application server), or that includes a front end component (e.g., a client computer having a graphical user interface), or a Web browser through which a user can interact with an implementation of the subject matter described in this specification, or any combination of one or more such back-end, middleware, or front-end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

The computing system 500 can include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. The computer system 500 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to the processor 502 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as a data storage device 506. Volatile media include dynamic memory, such as memory 504. Transmission media include coaxial cables, copper wire, and fiber optics, including the wires that comprise the bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise the bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
   receiving a stream of network messages, the stream of network messages comprising a variety of network events for various network devices;
   dividing the stream of network messages into contiguous and non-overlapping time slices, each time slice containing a subset of the stream of network messages;
   graphically displaying, via a user interface, the stream of messages;
   receiving, via the user interface, an identification of patterns within the stream of network messages, the patterns comprising groupings of the variety of network events;
   receiving, via the user interface, a determination of a set of operationalization scenarios for each pattern, wherein determining an operationalization scenario comprises manipulating a subset of the variety of network events; and
   operationalizing the patterns as correlation rules in a correlation engine to automatically detect or predict network alarms from input provided by a fault management system.

2. The method of claim 1, further comprising:
   normalizing the stream of network messages.

3. The method of claim 2, wherein the normalizing comprises:

removing identifying information of the various network devices;
removing timestamps associated with generation of the stream of network messages; and
removing location information of various network devices.

4. The method of claim 1, further comprising:
analyzing the patterns graphically by an expert user to identify the patterns and the set of operationalization scenarios.

5. The method of claim 1, wherein manipulating the subset of the variety of network events comprises:
determining that the subset of the variety of network events are repetitive; and
suppressing the subset of the variety of network events by removing the subset of the variety of network events from the stream of network messages.

6. The method of claim 1, wherein manipulating the subset of the variety of network events comprises:
determining that the subset of the variety of network events are repetitive; and
compressing the subset of the variety of network events by maintaining only one occurrence of a network event of the subset.

7. The method of claim 1, further comprising:
generating an alarm in response to an identified pattern that correlates to a hidden network issue or anticipating a future problem by triggering an alert or a ticket.

8. The method of claim 1, further comprising:
increasing a time shift for each time slice to create multiple contiguous network message sequences for identifying the patterns.

9. A system, comprising:
a memory; and
a processor executing instructions from the memory to:
receive a stream of network messages, the stream of network messages comprising a variety of network events for various network devices;
dividing the stream of network messages into contiguous and non-overlapping time slices, each time slice containing a subset of the stream of network messages;
graphically display, via a user interface, the stream of messages;
receive, via the user interface, identification of patterns within the stream of network messages, the patterns comprising groupings of the variety of network events;
receive, via the user interface, a determination of a set of operationalization scenarios for each pattern, wherein determining an operationalization scenario comprises manipulating a subset of the variety of network events; and
operationalize the patterns as correlation rules in a correlation engine to automatically detect or predict network alarms from input provided by a fault management system.

10. The system of claim 9, wherein the processor further executes the instructions from the memory to:
normalize the stream of network messages.

11. The system of claim 10, wherein the processor further executes the instructions from the memory to:
remove identifying information of the various network devices;
remove timestamps associated with generation of the stream of network messages; and
remove location information of various network devices.

12. The system of claim 9, wherein the processor further executes the instructions from the memory to:
analyze the patterns graphically by an expert user to identify the set of operationalization scenarios.

13. The system of claim 9, wherein manipulating the subset of the variety of network events comprises:
determining that the subset of the variety of network events are repetitive; and
suppressing the subset of the variety of network events by removing the subset of the variety of network events from the stream of network messages.

14. The system of claim 9, wherein manipulating the subset of the variety of network events comprises:
determining that the subset of the variety of network events are repetitive; and
compressing the subset of the variety of network events by maintaining only one occurrence of a network event of the subset.

15. The system of claim 9, wherein the processor further executes the instructions from the memory to:
generate an alarm in response to an identified pattern that correlates to a hidden network issue or anticipating a future problem by triggering an alert or a ticket.

16. The system of claim 9, wherein the processor further executes the instructions from the memory to:
increase a time shift for each time slice to create multiple contiguous network message sequences for identifying the patterns.

17. A non-transitory machine-readable storage medium encoded with instructions executable by at least one hardware processor of a network device, the non-transitory machine-readable storage medium comprising instructions to:
receive a stream of network messages, the stream of network messages comprising a variety of network events for various network devices;
dividing the stream of network messages into contiguous and non-overlapping time slices, each time slice containing a subset of the stream of network messages;
graphically displaying, via a user interface, the stream of messages;
receiving, via the graphical user interface, an indication of patterns within the stream of network messages, the patterns comprising groupings of the variety of network events;
receiving, via the user interface, a determination of a set of operationalization scenarios for each pattern, wherein determining an operationalization scenario comprises manipulating a subset of the variety of network events; and
operationalize the patterns as correlation rules in a correlation engine to automatically detect or predict network alarms from input provided by a fault management system.

18. The method of claim 1, further comprising:
assigning a first subset of the stream of network messages into a first family of equipment into equivalence classes; and
assigning a second subset of the stream of network messages into a second family of equipment into equivalence classes,
wherein the first family of equipment and the second family of equipment are assigned according to a Locality Sensitive Hashing (LSH) algorithm.

19. The method of claim 1, wherein the patterns within the stream of network messages are identified using a Frequent Pattern Growth feature of an Frequent Pattern (FP) Growth algorithm.

20. The method of claim 1, wherein the patterns within the stream of network messages are identified in parallel using a Frequent Pattern Growth feature of a Parallel Frequent Pattern (PFP) Growth algorithm.

21. The method of claim 1, wherein the set of operationalization comprises at least one of: one of suppression, compression, problem detection, or problem prediction.

* * * * *